No. 863,842.　　　　　　　　　　　　　　　　　PATENTED AUG. 20, 1907.
J. R. GEORGE.
CONVEYER FOR METAL BARS.
APPLICATION FILED MAR. 2, 1907.

Witnesses
Roy D. Tolman.
Penelope Comberbach.

Inventor
Jerome R. George.
By Rufus B. Fowler
Attorney

UNITED STATES PATENT OFFICE.

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CONVEYER FOR METAL BARS.

No. 863,842.     Specification of Letters Patent.     Patented Aug. 20, 1907.

Application filed March 2, 1907. Serial No. 360,207.

*To all whom it may concern:*

Figure 1:
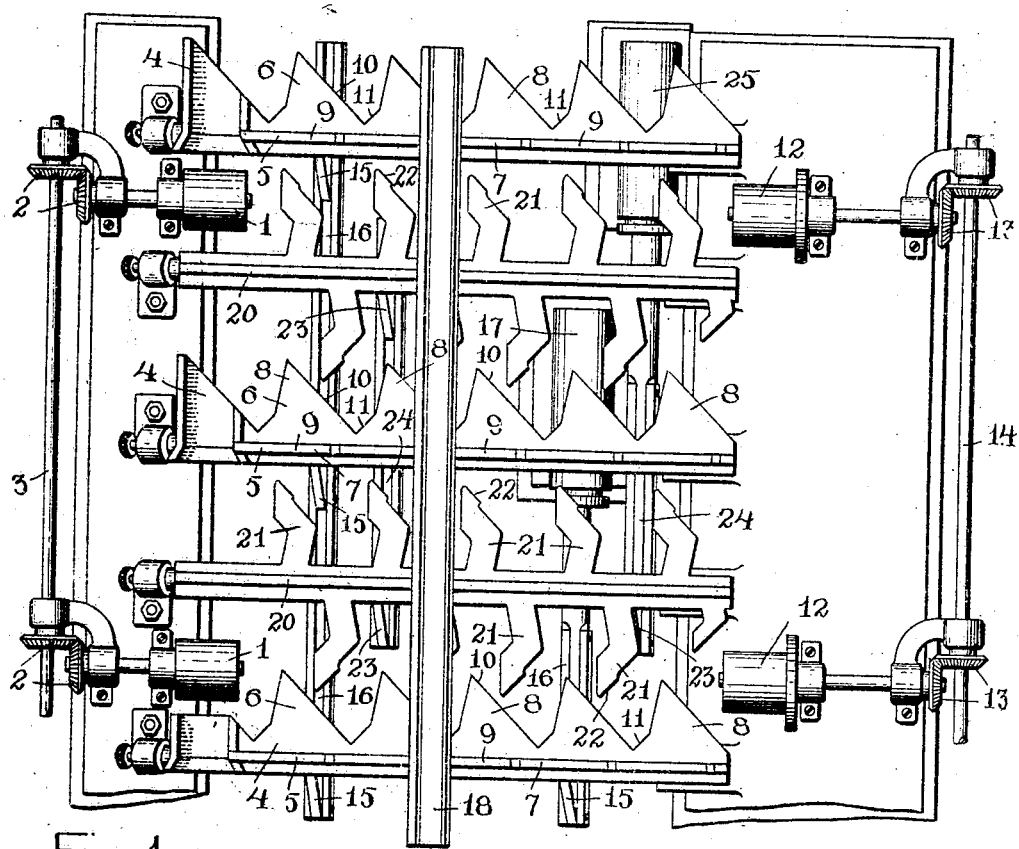
Figure 2:
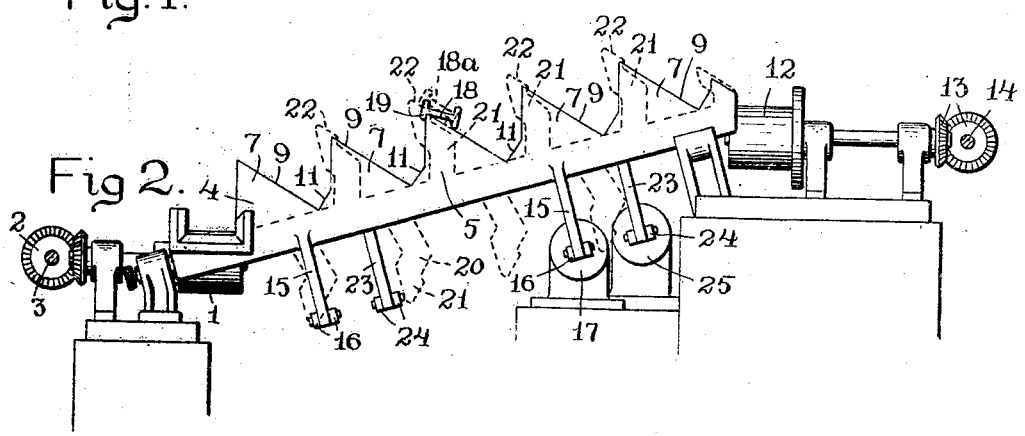

Be it known that I, JEROME R. GEORGE, a citizen of the United States, residing at Worcester, in the county of Worcester and Commonwealth of Massachusetts, have invented a new and useful Improvement in Conveyers for Metal Bars, of which the following is a specification, accompanied by drawings forming a part of the same, in which Figure 1 represents a plan view of a conveyer for metal bars embodying my invention. Fig. 2 is a side view showing one of the positions of a metal bar supported on a conveyer.

Similar reference letters and figures refer to similar parts in the different views.

My present invention relates to an improvement upon the conveyer shown and described in the Reissue Patent No. 12,520, issued to Victor E. Edwards August 14, 1906, and it has for its object to provide means for extending the inclined bearing surfaces of the conveyer bars shown in said patent, in order to adapt the conveyer for operation with that class of heated bars which are angular in their cross section, such, for example, as I-beams and the like.

My invention consists in a series of supplementary rocking bars provided with laterally extended arms, having bar supporting surfaces which are parallel with the inclined supporting surfaces of the conveyer bars when the supplemental arms are rocked to bring them into bearing relation with the bar, and it further consists in the construction and arrangement of parts as hereinafter described and pointed out in the annexed claims.

The conveyer to which my present invention applies, comprises conveyer rolls 1, driven by miter gears 2 from a common driving shaft 3. The conveyer rolls 1 are located between the ends of rocking conveyer bars 4 provided with radial notched blades 5 and 6 arranged at right angles to each other forming triangular teeth 7 and 8. The triangular teeth are provided with inclined sides 9 and 10, the inclination of which is greater than the coefficient of friction, so that a metal bar supported on the inclined edges of the teeth near their apex will slide by gravity to the bottom of the teeth and be brought into contact with the surfaces 11 at right angles to the inclined edges of the teeth. The two series of teeth 7 and 8 are arranged on the conveyer bars with the apices of the teeth 7 in planes midway between the apices of teeth 8. When the bar has slid to the bottom of the teeth 7 and is brought to rest against the surfaces 11, the conveyer bars are rocked one quarter turn, bringing the triangular teeth 8 from a horizontal to a vertical plane, and causing the metal bar to be lifted by and supported upon the inclined sides and near the apices of the teeth 8. The bar then slides by gravity down the inclined sides of the teeth 8 when the rocking motion of the conveyer bars is reversed, causing the bar to be lifted by and supported upon the inclined sides of the teeth 7. The rocking motion of the conveyer bars 4 will cause the metal bar to be alternately supported, first by one set of teeth 7 and then by the other set of teeth 8, with a period between each alternate rocking motion of the conveyer bars to allow the metal bar to slide down the inclined sides of the triangular teeth. This operation is repeated until the metal bar has been moved along the conveyer bars 4 by a step-by-step movement and be finally delivered upon a pair of conveyer rolls 12 driven by miter gears 13 from a common driving shaft 14. The heated bar from the rolling mill is delivered upon one end of the conveyer bars by a longitudinal movement as it rests upon the rotating conveyer rolls 1. The rocking of the conveyer bars 4 is accomplished by connecting radial arms 15 projecting from the under side of the conveyer bars 4 by means of connecting links 16 and by connecting one of the radial arms with a piston equipped cylinder 17.

The above described construction and operation of the conveyer represented in Figs. 1 and 2 of the drawings, is substantially like that shown in the aforesaid Reissue Patent to Edwards No. 12,520, and forms no part of my present invention.

Whenever bars, which are angular in their cross section, such as I-beams, are to be supported upon the inclined sides of the triangular teeth, they are liable to become caught on the apices of the teeth and held from sliding by gravity down the inclined sides of the teeth.

In the accompanying drawings I have shown such an I-beam at 18 resting across the apices of the teeth 7 of the several conveyer bars, with the flange 19 overhanging the apices of the teeth and preventing the sliding movement of the beam 18. To release heated bars of this description is the object of my present invention, and I accomplish this purpose by providing the conveyer with supplemental rocking bars 20 between the conveyer bars 4 and parallel therewith, and from opposite sides of the supplemental bars 20 I project the lateral arms 21, preferably lying in a horizontal plane and having their tips provided with bar supporting edges 22 which are parallel with the inclined sides of the triangular teeth when both are raised into vertical planes and in position to support a bar.

In Figs. 1 and 2 of the drawings the I-beam 18 is represented as resting across the apices of the vertical teeth 7 of the conveyer, and in Fig. 2 the I-beam 18 is represented by broken lines at 18ª as having been raised at its rear edge by the lateral arms 21 when raised into a vertical plane by rocking the bars 20, bringing the arms 21 into the position denoted by broken lines in Fig. 2. The rocking of the supplemental bars 20 is accomplished by providing them with radial arms 23, connected by links 24, one of said arms being connected with a piston equipped cylinder 25. The lateral arms 21 when raised into a vertical plane corresponding with the vertical planes of the supporting triangular teeth, serve to extend the bar supporting surfaces and lift the rear edges of the bars from the position shown by full lines at 18, Fig. 2, into the position shown by broken lines at 18a, Fig. 2, and prevent the flange 19 from engaging the points of the supporting teeth.

I claim,

1. In a conveyer of the class described, the combination with a series of inclined bar supporting surfaces, of a series of supplemental bar supports and means for bringing said supplemental supports into alinement with said bar supporting surfaces.

2. In a conveyer of the class described, the combination with a series of journaled conveyer bars, teeth projecting from said conveyer bars and having inclined sides arranged to form ways for the sliding movement of a metal bar thereon, of a series of supplemental arms provided with bar supporting surfaces, and means for bringing the bar supporting surfaces of said arms in supporting relation to a metal bar held on the teeth of the conveyer bars.

3. In a conveyer of the class described, the combination with a series of rocking conveyer bars having teeth arranged in rows and provided with bar supporting surfaces, of a series of rocking supplemental bars having lateral arms provided with bar supporting surfaces, said supplemental bars being journaled between said conveyer bars, means for rocking said conveyer bars, and means for rocking said supplemental bars.

4. In a conveyer of the class described, the combination with a series of triangular teeth capable of supporting a metal bar upon their apices, of a series of bar supporting arms corresponding with said teeth, means for rocking said teeth, and means for imparting a corresponding rocking motion to said arms to bring them into contact with a metal bar when supported on the apices of said teeth.

Dated this 27th day of February, 1907.

JEROME R. GEORGE.

Witnesses:
PENELOPE COMBERBACH,
RUFUS B. FOWLER.